(12) United States Patent
Song et al.

(10) Patent No.: US 8,160,731 B2
(45) Date of Patent: Apr. 17, 2012

(54) STABILIZED PLATFORM SYSTEM

(75) Inventors: Peng Song, Beijing (CN); Kunbo Wang, Beijing (CN); Jie Cao, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 338 days.

(21) Appl. No.: 12/543,492

(22) Filed: Aug. 18, 2009

(65) Prior Publication Data
US 2011/0046793 A1 Feb. 24, 2011

(51) Int. Cl.
*G05B 11/01* (2006.01)
(52) U.S. Cl. .......................... 700/71; 700/279
(58) Field of Classification Search ............ 700/71, 700/279
See application file for complete search history.

(56) References Cited

U.S. PATENT DOCUMENTS

| | | | |
|---|---|---|---|
| 4,275,605 A | 6/1981 | Kennel | |
| 6,202,566 B1* | 3/2001 | Hutchinson | 105/148 |
| RE37,374 E * | 9/2001 | Roston et al. | 318/561 |
| 6,609,037 B1* | 8/2003 | Bless et al. | 700/45 |
| 6,823,221 B2* | 11/2004 | Peck et al. | 700/61 |
| RE39,906 E * | 11/2007 | Roston et al. | 318/561 |
| 7,308,322 B1* | 12/2007 | Discenzo et al. | 700/28 |
| 7,386,372 B2* | 6/2008 | Breed et al. | 701/1 |
| 2002/0194716 A1* | 12/2002 | Berner et al. | 29/25 |
| 2004/0130442 A1* | 7/2004 | Breed et al. | 340/443 |
| 2004/0249485 A1* | 12/2004 | Bondarev et al. | 700/71 |
| 2005/0134440 A1* | 6/2005 | Breed | 340/435 |
| 2005/0192727 A1* | 9/2005 | Shostak et al. | 701/37 |
| 2005/0193537 A1* | 9/2005 | Berner et al. | 29/25 |

OTHER PUBLICATIONS

Frederick W. White, Stabilized Platform, May 21, 1974, Defense Technical Information Center (http://oai.dtic.mil/oai/oai?verb=getRecord&metadataPrefix=html&identifier=ADD001370).

* cited by examiner

*Primary Examiner* — Albert Decady
*Assistant Examiner* — Anthony Whittington
(74) *Attorney, Agent, or Firm* — Ren-Sheng International

(57) ABSTRACT

A stabilized platform system includes a platform, a chassis subject to external vibration, first and second servomechanisms fixed to the chassis, first support having an end rotatably coupled to the first servomechanism and an other end rotatably coupled to the platform, a second support having an end rotatably coupled to the second servomechanism and an other end rotatably coupled to the platform, a third support having an end fixed relative to one of the chassis and an other end rotatably coupled to the platform, one or more sensors fixed to the platform, and a controller coupled to the one or more sensors and the first and the second servomechanisms. The controller causes the servomechanisms to adjust the inclination angles of the platform to maintain a desired orientation of the platform.

10 Claims, 3 Drawing Sheets

STABILIZED PLATFORM SYSTEM

BACKGROUND

Unless otherwise indicated herein, the approaches described in this section are not prior art to the claims in this application and are not admitted to be prior art by inclusion in this section.

Current advances in technological development demand increasingly higher standards for automation and enhanced system stability. Many of these applications are currently found only in high-tech domains; however, with reduced accelerometer cost and footprint, it is now possible for this technology to be widely used in everyday life.

In space, the position of satellites is often adjusted, so that the satellites are pointed at ground stations at desirable angles to maintain uninterrupted communication with such ground stations.

The manufacturing industry also requires increasingly precise processing. When such processing occurs on micron and nanometer levels, a stable platform that can compensate for external vibrations in real-time will lead to increased machine precision and utility.

In the world of transportation, current technologies have already allowed individuals to travel with ease and speed. The next step is a more comfortable transit experience. Fluctuations on road and water surfaces make long distance travel a burden. Current measures to absorb shock are expensive and complex and only used in upscale vehicles, not yet suitable for mass deployment.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

In the drawings.

DETAILED DESCRIPTION

Figure 1:
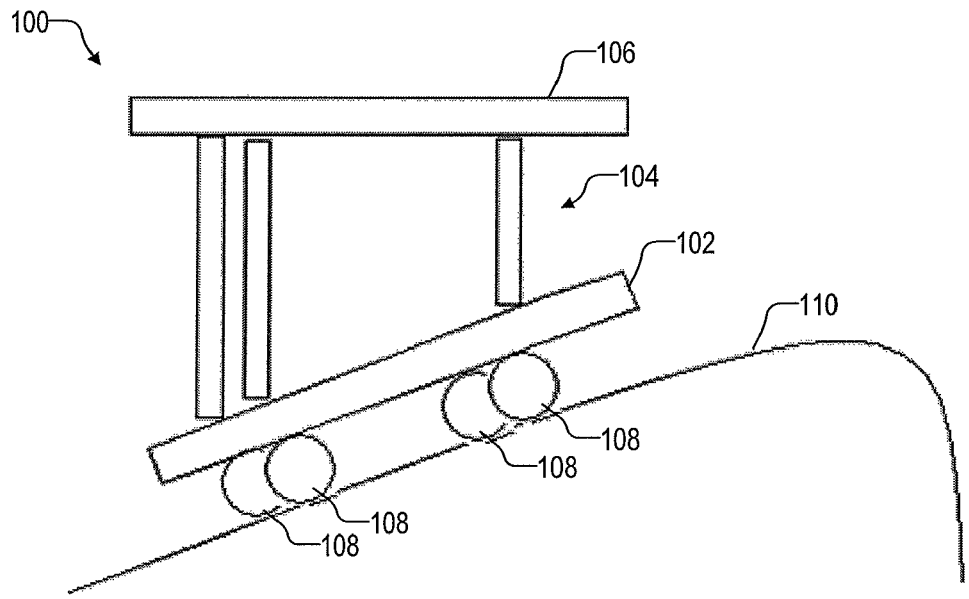
FIG. 1 illustrates an example stabilized platform system in one or more embodiments of the present disclosure.

In the following detailed description, reference is made to the accompanying drawings, which form a part hereof. In the drawings, similar symbols may identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to methods, apparatus, and systems related to a stabilized platform system that may be applied to precision instruments and vehicles such as cars, boats, airplanes, and trains. The system may provide a platform at a desired position (e.g., horizontally level) for passengers, cargos, and/or equipment. The system may be implemented with two dual axis accelerometers, two servomechanisms, a single chip microprocessor, as well as ordinary electrical circuit components, to achieve an efficient design for easy implementation. Data regarding inclination angles may be collected by the accelerometers and provided to the microprocessor, which in turn may control the servomechanisms to adjust the inclination angles to maintain the platform in the desired position.

FIG. 1 illustrates an example stabilized platform system 100 in one or more embodiments of the present disclosure. System 100 may include a chassis 102, a control layer 104, and a platform 106. Chassis 102 may be subject to external vibration. Chassis 102 may include wheels 108 or similar means that travel over an uneven road surface 110, thereby vibrating the chassis.

Figure 2:
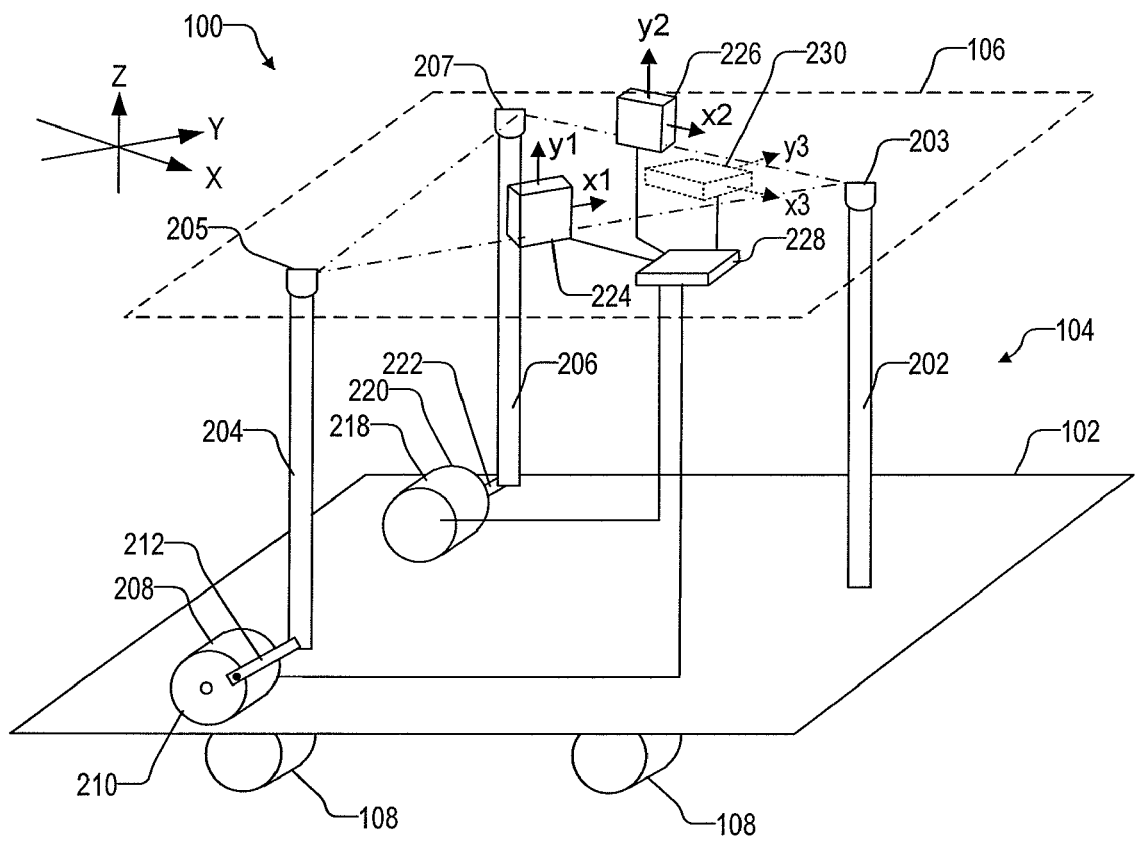
FIGS. 2 and 3 illustrate additional details of the system of FIG. 1 in one or more embodiments of the present disclosure.

FIG. 2 illustrates additional details of system 100 in one or more embodiments of the present disclosure. Three mounting points 203, 205, and 207 may be designated on platform 106 (shown in phantom) as three points define a plane. Points 203, 205, and 207 may form an isosceles triangle with point 203 being an apex and points 205 and 207 forming two vertices. In one or more embodiments of the present disclosure, points 203, 205, and 207 form an isosceles right triangle having two equal legs aligned along platform axes X and Y.

Platform 106 may be supported at mounting points 203, 205, and 207 by support rods 202, 204, and 206, respectively. Support rod 202 may be a fixed-length rod that has an upper end rotatably coupled at mounting point 203 to platform 106, and a lower end fixed relative to chassis 102. Thus, mounting point 203 may form a fixed pivot for platform 106. Support rods 204 and 206 may be vertically sliding rods that have upper ends rotatably coupled mounting points 205 and 207. Thus, mounting points 205 and 207 may independently move up and down. The rotatable coupling between platform 106 and support rods 202, 204, and 206 should allow the platform to rotate about platform axes X and Y. For example, the rotatable coupling may be ball joints or swivels.

A servomechanism 208 may be connected to a disc 210, which may be coupled by a link 212 to the lower end of support rod 204. Similarly, a servomechanism 218 may be connected to a disc 220, which may be coupled by a link 222 to the lower end of support rod 206. Servomechanism 208 may rotate to vertically translate support rod 204, which in turn may pivot platform 106 about platform axis X. Similarly, servomechanism 208 may rotate to vertically translate support rod 204, which in turn may pivot platform 106 about platform axis Y. The desired platform position may be horizontally flat or any other position set by the user.

Figure 3:
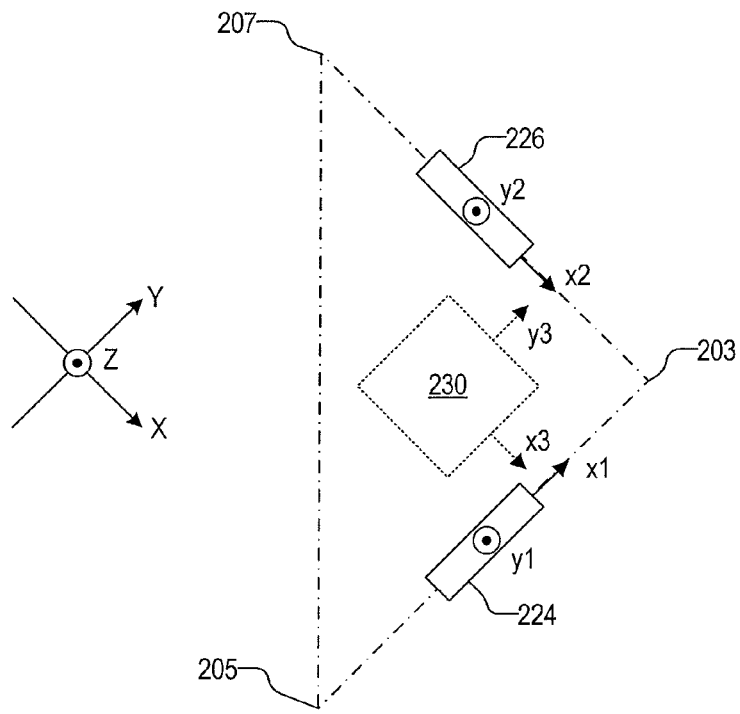

In one or more embodiments of the present disclosure, two dual axis accelerometers 224 and 226 may be used to sense the inclinations of platform 106 about platform axes X and Y. To sense inclination of platform 106 about platform axis X, accelerometer 224 may be vertically mounted to the platform so its accelerometer axis y1 is parallel to gravity and its accelerometer axis x1 is perpendicular to the platform axis X as shown in FIG. 3. Similarly, to sense inclination of platform 106 about platform axis Y, accelerometer 226 may be vertically mounted to the platform so its accelerometer axis y2 is parallel to gravity and its accelerometer axis x2 is perpendicular to the platform axis X as shown in FIG. 3. The inclination angles of platform 106 may be calculated using the following two formulas:

$$\alpha = \arctan(A_{x1}/A_{y1}), \quad (1)$$

$$\beta = \arctan(A_{x2}/A_{y2}), \quad (2)$$

where α and β represent platform inclination angles about platform axes X and Y, respectively, $A_{x1}$ and $A_{y1}$ represent the outputs from accelerometer 224 for accelerometer axes x1 and y1, respectively, and $A_{x2}$ and $A_{y2}$ represent the outputs from accelerometer 226 for accelerometer axes x2 and y2, respectively. Accelerometers 224 and 226 may be microelectromechanical systems (MEMS) accelerometers, such as the MXC6202 from MEMSIC INC. of Andover, Mass.

A controller 228 may be mounted on platform 106, and the controller may be coupled to accelerometers 224 and 226 and servomechanisms 208 and 218. Controller 228 may be a closed-loop controller that uses outputs from accelerometers 224 and 226 as feedback to control the position of platform 106. Using such a closed-loop control system, real-time adjustment to the platform position is possible, thereby reducing the inclination angles of platform 106 as well as the required range of motion for servomechanisms 208 and 218.

In one or more embodiments of the present disclosure, a single dual axis accelerometer 230 (shown in phantom) may be used to sense the inclinations of platform 106 about platform axes X and Y. Accelerometer 230 may be horizontally mounted to platform 106 so its accelerometer axis x3 is parallel to platform axis X and its accelerometer axis y3 is parallel to platform axis Y. The inclination angles of platform 106 may be calculated using the following two formulas:

$$\alpha = \arcsin(A_{x3}/g), \quad (3)$$

$$\beta = \arcsin(A_{y3}/g), \quad (4)$$

where α and β represent platform inclination angles about platform axes X and Y, respectively, $A_{x3}$ and $A_{y3}$ represent the outputs from accelerometer 230 for accelerometer axes x3 and y3, respectively, and g is the gravity acceleration. Accelerometers 230 may be a MEMS accelerometer, such as the MXC6202 from MEMSIC INC. of Andover, Mass.

Figure 4:
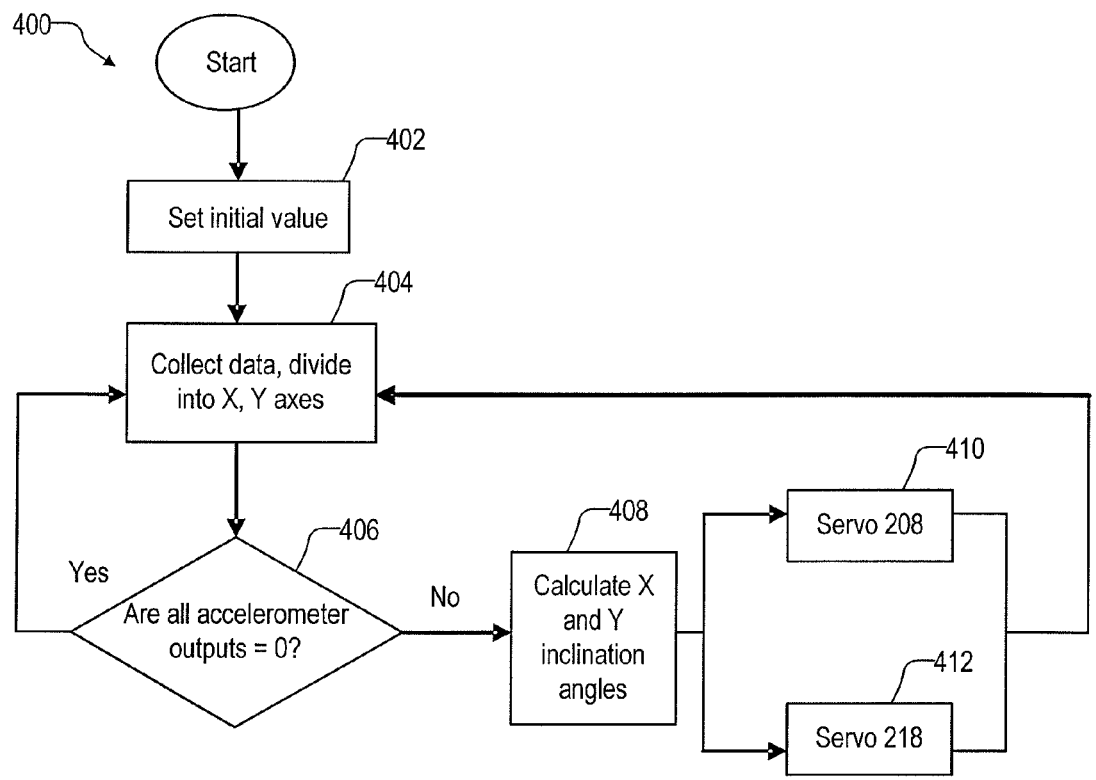
FIG. 4 illustrates an example a closed-loop control scheme for system of FIG. 1 in one or more embodiments of the present disclosure.

FIG. 4 illustrates an example closed-loop control method 400 executed by controller 228 in one or more embodiments of the present disclosure. Method 400 may include blocks 402, 404, 406, 408, 410, and 412.

In block 402, controller 228 may provide initial control values to servomechanisms 208 and 218, setting forth an initial operating condition. Block 402 may be followed by block 404.

In block 404, controller 228 may collect output data from one or more accelerometers. Controller 228 may separate output data into a first group for those data for determining platform axis X and a second group for those for determining platform axis Y. Block 404 may be followed by block 408.

In block 406, controller 228 may determine if platform 106 is at the desired position (e.g., horizontally level). If so, block 408 may be followed by block 404. Otherwise block 408 may be followed by block 408. In the embodiments using two dual axis accelerometers, platform 106 may be horizontally level when accelerometer output $A_{x1}$ in the first group and accelerometer output $A_{x2}$ in the second group are both equal to 0, which indicates that platform 106 is horizontally level. In the embodiments using one dual axis accelerometers, platform 106 may be horizontally level when accelerometer output $A_{x3}$ in the first group and accelerometer output $A_{y3}$ in the second group are both equal to 0. Note that controller 228 may be initially calibrated to remove any bias in the accelerometers due to imperfections in the manufacturing process.

In block 408, controller 228 may determine the inclination angles of platform 106. Depending if one or two accelerometers are used, the inclination angles may be determined from equations 1, 2, 3, and 4. Block 408 may be followed by blocks 410 and 412.

In block 410, controller 228 may determine the vertical displacement of servomechanism 208 that is necessary to pivot platform 106 about platform axis X to return the platform to the desired position, and provide a corresponding control signal to the servomechanism. In block 412, controller 228 may determine the vertical displacement of servomechanism 218 that is necessary to pivot platform 106 about platform axis Y to return the platform to the desired position, and provide a corresponding control signal to the servomechanism. Blocks 410 and 412 are followed by block 404 and method 400 may again loop through the above described blocks to maintain platform 106 at the desired position.

Figure 5:
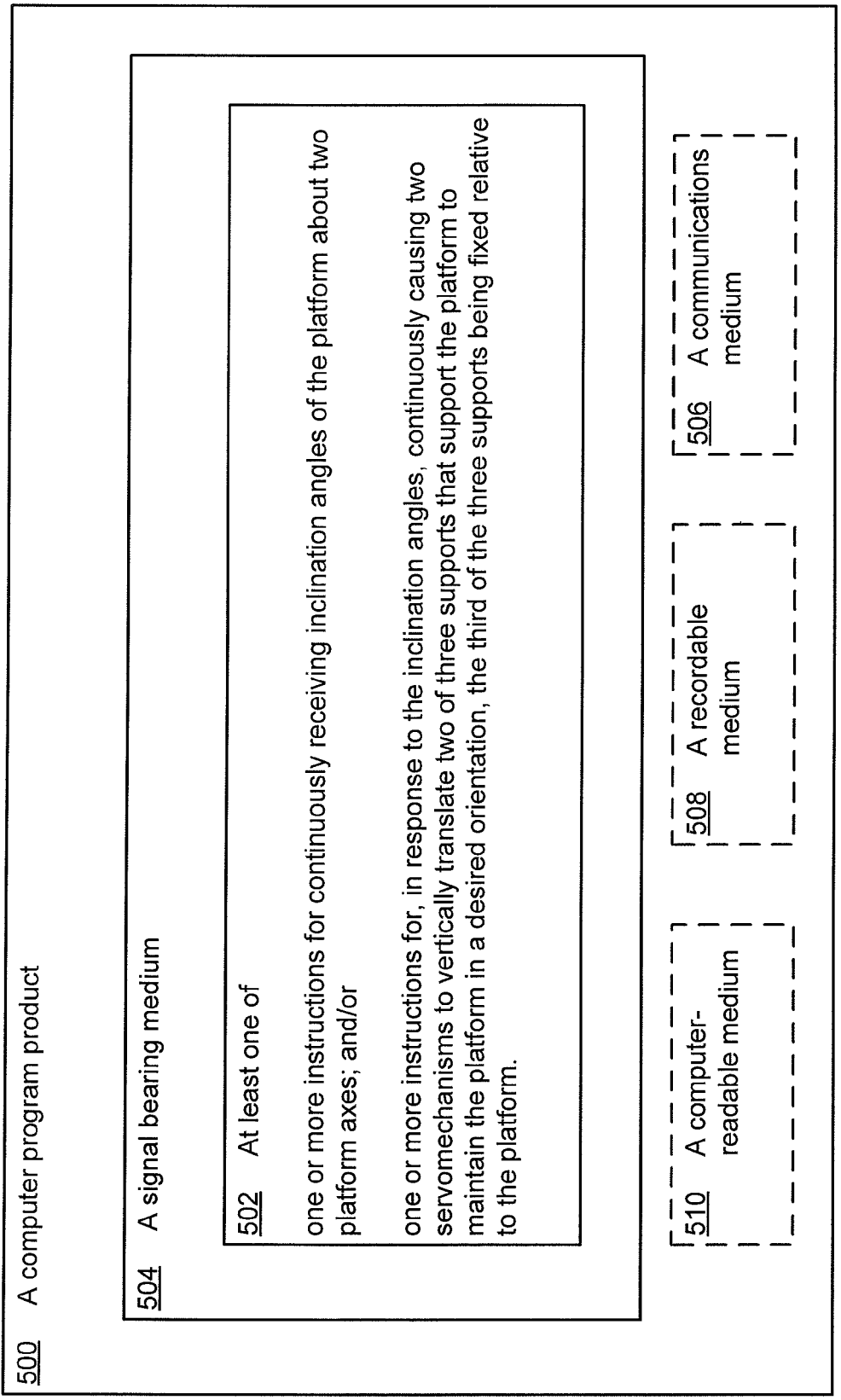
FIG. 5 is a block diagram illustrating an example computer program product for the system of FIG. 1 in one or more embodiments of the present disclosure.

FIG. 5 is a block diagram illustrating a computer program product 500 for system 100, arranged in accordance with one or more embodiments of the present disclosure. Computer program product 500 may include one or more sets of instructions 402 for executing method 400. Computer program product 500 may be transmitted in a signal bearing medium 504 or another similar communication medium 506. Computer program product 500 may be recorded in a computer readable medium 508 or another similar recordable medium 510.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A data processing system may be implemented utilizing any suitable commercially available components, such as those that may be found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. For example, the orientation of servomechanisms 208 and 218 and support rods 202, 204, and 206 may be reversed so they are fixed to platform 106 and rotatably coupled to chassis 102. Instead of dual axis accelerometers, three axis accelerometers may be used. The various aspects and embodiments disclosed herein are for purposes of illustration and are not intended to be limiting, with the true scope and spirit being indicated by the following claims.

We claim:

1. A stabilized platform system, comprising:
   a platform;
   a chassis subject to external vibration;
   a first servomechanism being fixed relative to one of the chassis and the platform;
   a second servomechanism being fixed relative to one of the chassis and the platform;
   a first support having an end rotatably coupled to the first servomechanism and an other end rotatably coupled to one of the chassis and the platform that is not fixed relative to the first servomechanism;
   a second support having an end rotatably coupled to the second servomechanism and an other end rotatably coupled to one of the chassis and the platform that is not fixed relative to the second servomechanism;
   a third support having an end fixed relative to one of the chassis and the platform and an other end rotatably coupled to an other of the chassis and the platform;
   one or more sensors being fixed relative to the platform to detect inclination angles of the platform about two platform axes; and
   a controller being coupled to the sensors to receive the inclination angles of the platform, and to the first and the second servomechanism to adjust the inclination angles of the platform to maintain a desired position of the platform,
   wherein the first, the second, and the third support are coupled to the platform at three mounting points, the three mounting points are located at vertices of an isosceles triangle.

2. The system of claim 1, wherein the isosceles triangle is an isosceles right triangle.

3. The system of claim 1, wherein
   a first accelerometer is vertically mounted to the platform so its first accelerometer axis is parallel to a first equal side of the isosceles triangle and its second accelerometer axis is parallel to gravity, and
   a second accelerometer is vertically mounted to the platform so its first accelerometer axis is parallel to a second equal side of the isosceles triangle and its second accelerometer axis is parallel to gravity.

4. The system of claim 1, wherein one accelerometer is horizontally mounted to the platform so a first accelerometer axis is parallel to a first platform axis and a second accelerometer axis is parallel to a second platform axis.

5. The system of claim 1, the first and the second servomechanisms are fixed relative to the chassis;
   the first support has the other end rotatably coupled to the platform;
   the second support has the other end rotatably coupled to the platform; and
   a third support has the end fixed relative to the chassis and the other end rotatably coupled to the platform.

6. The system of claim 1, wherein the first and the second servomechanisms each comprises a servo motor and a link that couples the motor to a corresponding support.

7. The system of claim 1, wherein the chassis further comprises wheels.

8. The system of claim 1, wherein the stabilized system is a car, a boat, a plane, a helicopter, or a train.

9. The system of claim 1, wherein the one or more sensors are microelectromechanical systems (MEMS) accelerometers.

10. The system of claim 1, wherein the desired orientation of the platform is horizontally level.

* * * * *